United States Patent Office 3,491,071
Patented Jan. 20, 1970

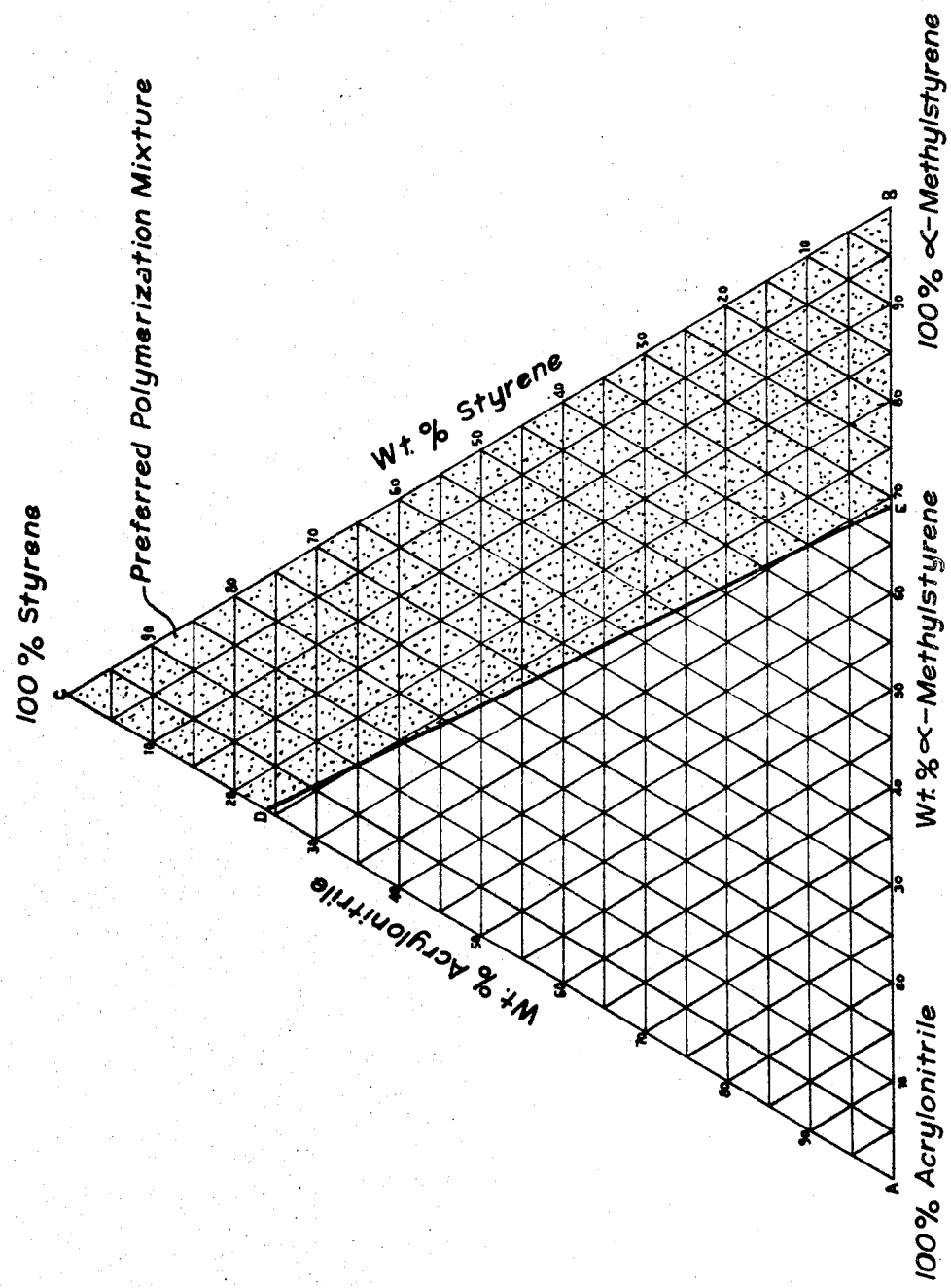

3,491,071
**POLYMERIZATION OF ACRYLONITRILE STY-
RENE AND ALPHAMETHYLSTYRENE**
Rosario Lanzo, Mantova, Italy, assignor to Montecatini
Edison S.p.A., Milan, Italy
Continuation of application Ser. No. 404,794, Oct. 19,
1964. This application July 1, 1968, Ser. No. 745,076
Claims priority, application Italy, Oct. 17, 1963,
21,376/63
Int. Cl. C08f 19/18
U.S. Cl. 260—80.78                                3 Claims

ABSTRACT OF THE DISCLOSURE

A process for producing copolymers of acrylonitrile styrene and alpha-methylstyrene wherein a mixture of these monomers is polymerized in the presence of a catalyst and an aqueous suspension at a temperature gradually raised from about 100 to about 140° C. until the degree of conversion of the monomer to the polymers is about 90 to 98% and then steam-distilling the mass to remove unreacted monomers when the temperature reaches about 140° C. and this conversion is attained to produce a product of high stampability and freedom from yellowing.

---

This application is a continuation of my copending application Ser. No. 404,794, filed Oct. 19, 1964, and now abandoned.

My present invention relates to styrenic copolymers with acrylonitrile and, more particularly, to an improved process for the production of such polymers capable of yielding substances having high thermal stability and the products resulting from this process.

Styrene and acrylonitrile copolymers have been produced heretofore and have been characterized, when resulting from conventional polymerization techniques, by a lack of transparency or considerable discoloration, low thermal stability and poor stampability. The latter term is employed in the polymer field to define the flow characteristics of a polymer and will be used hereafter to refer to the flow of a polymeric material as tested by ASTM Standard D-569. This test, in accordance with the practice of Rossi and Peaks involves the application of pressure at about 1500 p.s.i. at a temperature of 135° C., the stampability being driven in terms of fractions of an inch of flow per unit of time (usually minutes). In general, acrylonitrile-styrenic copolymers are produced by suspension polymerization in an aqueous vehicle and have a tendency to yellow during the production process or thereafter. This yellowing markedly reduces the utility of the polymers and has limited their acceptance in the field. Moreover, the thermal stability of the copolymers produced by earlier methods is relatively low, i.e. the polymers have a relatively low HDT value, this parameter being a measure of the temperature at which thermal distortion under the load commences. For the present purposes the HDT of a particular copolymer will be the temperature measured in accordance with ASTM Standard D-648 at which a piece of the resin (0.5 inch x 0.5 inch) is deformed under a load of 264 p.s.i. For most of the common earlier acrylonitrile-styrene copolymers the HDT is less than 100° C.

In order to improve the stampability of conventional copolymers of this type it has been proposed that the polymerization reaction be carried out in the presence of so-called "chain-transfer" agents such as those of the mercaptan. The resulting copolymers have a relatively low-molecular weight and are unusually moldable. It has been observed, however, that the consumption of the chain-transfer agent varies during the course of the reaction so that the regulating effect of the agent is relatively poor and the reactions yield copolymers of different molecular weights depending upon the degree of conversion of the monomers to the copolymers. The thermal stability of the copolymers produced with the aid of a chain-transfer agent is not, however, much greater than that of similar copolymers produced in the absence of this agent. Additionally, the resulting copolymers evidence the same yellowing characteristics of the copolymers produced in the absence of this agent. It has been suggested that the yellowing of the copolymer is a consequence of the in situ formation of polyacrylonitriles and efforts have been made to limit the formation of these polyacrylonitriles, and more commonly to remove these polymers at the conclusion of the polymerization reaction. Thus steam distillation has been effected after termination of the reaction to eliminate from the product any residual unreacted monomers which would otherwise tend to form polyacrylonitrile. This technique has been ineffective, however, in preventing the yellowing of the desired product.

It is, therefore, the principal object of the present invention to provide a process for the production of an acrylonitrile-styrenic copolymer wherein the afore-described disadvantages can be eliminated, a more specific object of this invention is to provide a nonyellowing or substantially nonyellowing styrene copolymer with acrylonitrile as well as an improved process for making same.

Yet another object of my invention is to provide a processing for the copolymerization of styrene and acrylonitrile which is capable of yielding a copolymer of high thermic stability and, advantageously, an HDT which is usually higher than 100° C. as measured under ASTM Standard D-648.

Still a further object of the invention is to provide a styrenic and acrylonitrile polymer whose moldability by conventional molding processes is excellent and which has a high degree of transparency while possessing excellent thermal characteristics. These objects and those which will become apparent hereinafter are attained, in accordance with my present invention, by a process which is at least in part based upon my discovery that the yellowing of styrenic and acrylonitrile copolymers are possibly due to the formation of polyacrylonitrile at or just prior to termination of the polymerization reaction. According to an important feature of the present invention, therefore, at least one styrenic monomer is suspension polymerized with acrylonitrile monomer and prior to completion of the reaction the polymerization mass is subjected to a steam-distillation to remove excess acrylonitrile. Surprisingly, it has been found that the steam-distillation of the mass to eliminate acrylonitrile prior to the completion of the reaction although after at least 90% completion does not significantly reduce the yield of the copolymer, but yet insures that the product will remain free from the yellowing characterizing earlier copolymers constituted in major part of styrene and the acrylonitrile. There is, in fact, every evidence that the polyacrylonitrile formation resulting in yellowing of the product commences after the reaction has been about 98% completed and it is an important aspect of this invention that the steam-distillation of the reaction mass to eliminate acrylonitrile therefrom is carried out when the degree of conversion ranges between 90% and 98%, preferably, from 94% to 96%.

According to another aspect of this invention, the stampability of a styrene-acrylonitrile copolymer, and thus its moldability, are increased with respect to the stampability of similar copolymers produced by conventional techniques by about 25% and higher when the reaction mass contains alpha-methylstyrene in addition to styrene and acrylonitrile monomers. More particularly, it has been found that the polymerization substances should include between 20 to 35% by weight acrylonitrile, with the remainder being constituted by 80 to 65% by weight of styrenic compounds constituted at least in part by monomeric styrene and monomeric alpha-methylstyrene. Thus, according to the present invention, the balance of the monomeric system ingredients, will consist of at least 5% by weight of styrene and at least 10% by weight of alpha-methylstyrene. Of the 80 to 65% by weight of the monomeric mixture constituted by the styrenic component, approximately 90 to 5% by weight will consist of styrene while the balance of substances 10 to 95% by weight will consist of alpha-methylstyrene.

In the accompanying drawing I show a three-component diagram whose apexes A, B and C represent 100% by weight of acrylonitrile, and 100% by weight alpha-methylstyrene and 100% by weight styrene, respectively.

This composition diagram defines the proportions of the various monomers in the monomeric mixture to be dispersed in the suspension vehicle. It has been found more particularly that use of a monomeric system within the area D–E of the diagram and especially those containing an excess of about 5% by weight acrylonitrile, yield copolymers of excellent stampability by comparison with the stampability of earlier copolymers of acrylonitrile and styrene alone. Acrylonitrile proportions of at least 5% by weight of the monomeric mixture are preferred to compensate for the solubility of acrylonitrile in the aqueous medium. Furthermore, the resulting copolymers have excellent thermal stability as will be apparent hereinafter.

According to another aspect of the present invention, the stampability of the copolymer produced from the monomeric mixture of styrene, alpha-methylstyrene and acrylonitrile is improved by making use of a copolymerization process involving characteristic thermal or temperature stages as will be apparent hereinafter. This predetermined thermic cycle is designed to avoid the increase of molecular weight during the course of the polymerization reaction and believed to be a consequence of the "gel" effect described by Tromsdorf. This improved technique involves the continuous increase in the polymerization or reaction temperature during the course of the reaction and makes it possible to obtain a copolymer having a predetermined molecular weight within a relatively narrow and desirous range during the entire polymerization reaction whereby, for example, there is little tendency for low-molecular-weight polymers to form during one portion of the reaction and high-molecular-weight polymers to form during another part. The steam-distillation step discussed above is then carried out before the degree of conversion of the monomers has reached a value characteristic of that resulting at the final temperature employed for the reaction in the thermic cycle selected.

The copolymerization reaction is carried out in aqueous suspension using suspending systems conventional in the art of styrene-acrylonitrile copolymerization generally. It is preferred, in accordance with the present invention, to constitute the reaction mass of equal parts (by weight) of the vehicle (i.e. water) and the monomeric mixture (i.e. the above-described proportions of acrylonitrile, alpha-methylstyrene and styrene). Thus the weight ratio of monomeric mixture and water will be approximately 1 (unity). A wide variety of conventional suspending agents may be employed although best results are obtained when these agents include compounds which are capable of stabilizing the suspension without, however, influencing adversely the transparency or optical clarity of the resulting copolymer. Thus it has been found that excellent copolymers are produced when the suspending agent consists of or includes an alkaline-hydrolysis product (e.g. 75% hydrolyzed) polymethylacrylate. A suitable agent of this nature is used in a 5% aqueous solution having a viscosity of 200 cps. at room temperature. Other suitable suspension agents of the general character described are the copolymers of methacrylic acid and methylmethacrylate.

The invention will be more evident from the following specific examples, provided to give the best mode presently known of taking advantage of the instant invention.

EXAMPLE I

The copolymerization vessel is a glass-lined, stainless-steel autoclave provided with a mechanical stirrer. A 100 parts by weight of monomeric mixture is added. The mixture consists of 71% by weight styrene and 29% by weight acrylonitrile. A free-radical polymerization catalyst (i.e. ditertiary-butyl-peroxide) was added in an amount of 0.03% by weight of the monomeric mixture.

The autoclave was closed and heated to a temperature of 110° C. for 50 minutes to commence the polymerization reaction. After this period, the suspending system was added; the suspending system consisted of a mixture of 0.2 part by weight of sodium sulfate and 0.5 part by weight of a polymer of methacrylic acid and methylmethacrylate. The autoclave was closed and the reaction mixture brought to a temperature of 110° C. and held at this temperature for two hours. The temperature of the reaction mass was then raised to 150° C. over a period of three hours and then held at this temperature for an additional two hours. Thereafter, the reaction mass was subjected to a steam-distillation to remove unreacted monomers. The contents of the autoclave were cooled and the resulting beads of the acrylonitrile/alpha-methylstyrene/styrene copolymer were removed, centrifuged, dried and then shaped by extrusion and molding for testing in accordance with the ASTM standards mentioned earlier. The product had an HDT of 95° C., a stampability of 0.32 inch in two minutes, and a light-yellow coloration.

EXAMPLE II

Using the identical conditions and proportions but with the addition of 0.2% by weight of a chain-transfer agent with respect to the monomeric component (i.e. with tert-dodecylmercaptan as chain-transfer agent) the product was found to have the same HDT, an improved stampability of 0.48 inch in two minutes, and a light-yellow coloration similar to that of the earlier product. Thus the chain-transfer agent itself was incapable of modifying the optical properties of the copolymer or its thermal stability.

EXAMPLE III 100 parts by weight of water were placed into the polymerization autoclave described in Example II and 100 parts by weight of a monomeric mixture were added; the monomeric mixture consisted of 58% by weight of styrene, 14% by weight alpha-methyl-styrene and 28% by weight acrylonitrile.

Thereafter the catalyst consisting of 0.15%, by weight of the monomeric mixture, of ditertiary butylperoxide was added.

Polymerization was started by heating the reaction mixture to a temperature of 112° during the period of 50 minutes after which the suspending system was added. The latter system consisted of 0.2% by weight of sodium sulfate (with respect to the monomeric mixture) and 0.5% by weight of hydrolyzed polymethylmethacrylate with 75% hydrolysis grade by weight of the monomeric mixture. The latter substance was a product of the partial-alkaline hydrolysis of polymethylmethacrylate and had, in a 5% by weight aqueous solution, a viscosity of 200 cps. at room temperature. The reaction mixture was maintained under heat and stirring while the polymerization temperature was increased from 112° C. to 150° C. during the period of 9.5 hours and steam-distillation carried out to remove unreacted monomers when the temperature reached 150° C. The contents of the autoclave were cooled and the beads of the copolymer were centrifuged, dried, extruded and molded. The product had an HDT of 100° C., a stampability of 0.42 inch in two minutes and a light yellow coloration.

EXAMPLE IV

Using the process of Example III but substituting for the monomeric component of that system, a mixture having the following composition: 32.5% by weight styrene, 36.0% by weight alpha-methylstyrene and 31.5% by weight acrylonitrile, a copolymer was obtained having the substantially higher HDT of 104° C. The stampability of this product was 0.38 inch in two minutes and the product had a light-yellow coloration. This example demonstrates, by comparison with Example III, that the increase of the alpha-methylstyrene proportion in the mixture improves the thermal stability of the product without causing a significant lowering the stampability or increasing the discoloration of the product.

EXAMPLE V

A monomeric mixture consisting of 32.5% by weight styrene, 36.0% by weight alpha-methylstyrene and 31.5% by weight acrylonitrile was polymerized in the reaction vessel of Example III using two different thermal cycles.

Cycle V(a)

The polymerization mass consisting of the monomeric component described above, in equal weight of water and the suspending system of Example III is subjected to temperature elevation from 25° C. to 112° C. continuously over a period of 50 minutes. Thereafter, the temperature of the autoclave was continuously increased gradually from 112° C. to the final temperature of 150° C. during a period of 9.5 hours. At this time and upon attainment of the maximum temperature the mass was steam-distilled to remove unreacted monomers. The autoclave was discharged and the polymer beads centrifuged, dried, extruded and molded. The product had an HDT of 104° C., i.e. identical with that of Example IV and a stampability of 0.38 inch in two minutes, with a light-yellow colorization. The reproducibility of the reaction is thus demonstrated.

Cycle V(b)

The polymerizable mixture was heated from 25° C. to 112° C. by a period of one hour, the heating being such that the temperature rise was substantially linear. Thereafter, the temperature was increased gradually and linearly to 150° C. during a period of six hours. With this temperature reached, the reaction mixture was steam-distilled and the copolymer processed as before. The copolymer was found to have an HDT of 104° C. although its stampability was increased to 0.47 inch in two minutes; the polymer possessed a light-yellow coloration. The example thus demonstrates the surprising significance of the thermal cycle V(b). It has been found, more particularly that a six-hour temperature rise from 112° C. to 150° C. yields unexplainable increase in stampability.

EXAMPLE VI

Following the procedure of cycle V(b) above, a monomeric mixture consisting of 32.5% by weight styrene, 36% by weight alpha-methylstyrene, and 31.5% of weight acrylonitrile were copolymerized and yielded the characteristics described. When the reaction was carried out with the temperature increase during the latter part of the cycle over a period of six hours, the steam distillation was carried out beginning from 140° C. instead of 150° C.

The product was practically colorless and had a HDT of 104° C. and a stampability of 0.47 inch in two minutes.

From this example it can be seen that the yellowing of the copolymer can be reduced or eliminated entirely if at a terminal stage in the reaction, corresponding to substantially complete copolymerization but prior to actual completion of the reaction, the reaction mass is steam-distilled to eliminate residual monomers.

I claim.

1. A process for producing styrene/alpha-methyl styrene/acrylonitrile copolymers of high stampability, freedom from yellowing phenomena and having an HDT in excess of 100° C., comprising the steps of:
    (a) polymerizing in aqueous suspension a monomer mixture consisting of 20 to 35% by weight acrylonitrile and 80 to 65% by weight of an alpha-methylstyrene/styrene mixture within the region D–E–B–C of the drawing;
    (b) gradually heating the polymerization mass of step (a) over a period of at least several hours during the course of polymerization to effect a temperature rise from a temperature of about 100° C. to a temperature of about 140° C. over said period to effect a degree of conversion of the monomers to the copolymer between substantially 90% and 98%; and
    (c) steam-distilling unreacted monomer from the polymerization system prior to completion of polymerization when the temperature has attained about 140° C. and a minimum conversion of monomers to the copolymer of about 90% is achieved thereby terminating further polymerization.

2. The process defined in claim 1 wherein the steam distillation of step (c) is carried out when the conversion of said monomers to the copolymers is about 94 to 96%.

3. The process defined in claim 2 wherein the polymerization system is initially heated in step (b) to a temperature of about 112° C. and a suspension medium including at least one substance selected from the group consisting of the partial-hydrolysis products of polymethyl methacrylate and copoylmers of methacrylic acid and methylmethacrylate is than added.

References Cited

UNITED STATES PATENTS 3,201,375    8/1965    Finestone et al.

JOSEPH L. SCHOFER, Primary Examiner

STANFORD M. LEVIN, Assistant Examiner

U.S. Cl. X.R.

260—25.5